Sept. 15, 1953
F. W. JATUNN
2,651,904
ADJUSTABLE CUTTER BAR FOR LAWN MOWERS
Filed Nov. 3, 1951
2 Sheets—Sheet 2
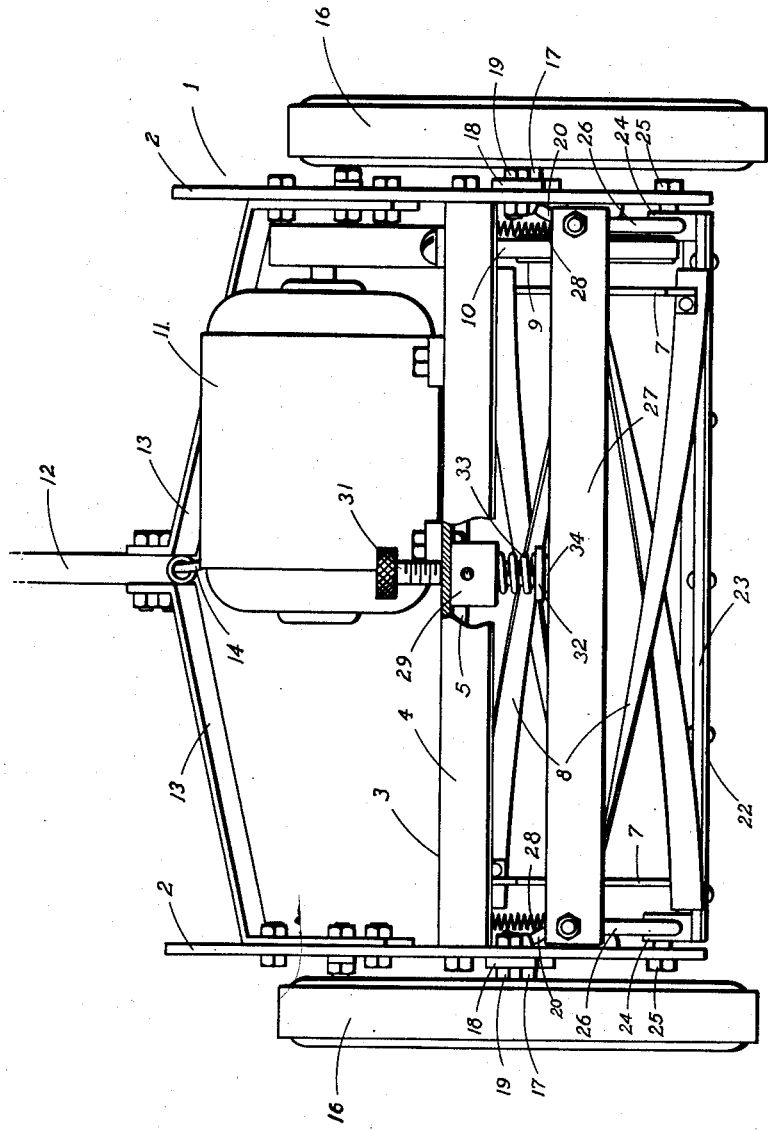
INVENTOR
*Franklin W. Jatunn*
BY *Webster & Webster*
ATTORNEYS Patented Sept. 15, 1953

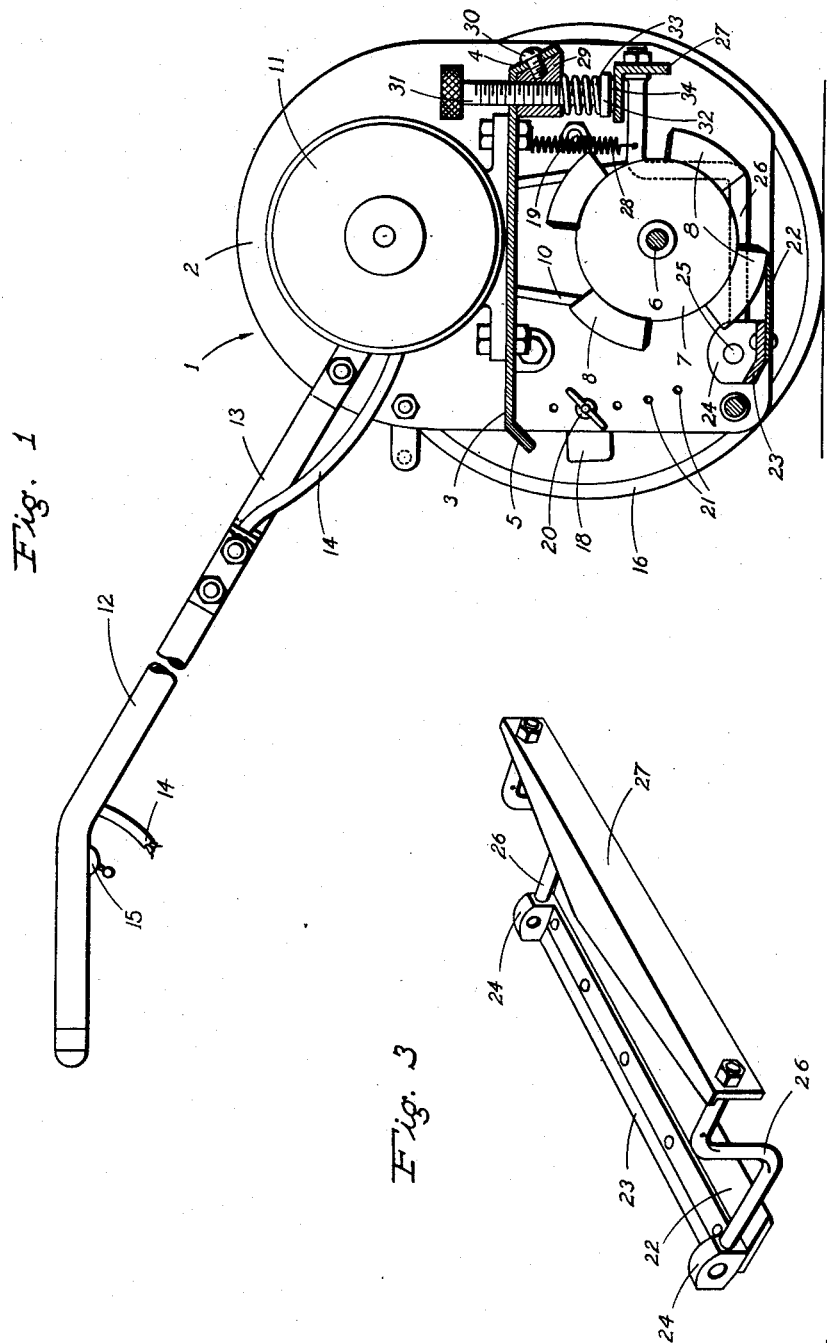

2,651,904

UNITED STATES PATENT OFFICE 2,651,904

ADJUSTABLE CUTTER BAR FOR LAWN MOWERS

Franklin W. Jatunn, Sacramento, Calif.

Application November 3, 1951, Serial No. 254,744

3 Claims. (Cl. 56—249)

This invention pertains to improvements in lawn mowers; the present application being a continuation in part of my copending application, Serial No. 94,827, filed May 23, 1949, now abandoned.

The major object of this invention is to provide a lawn mower wherein the cutter bar is vertically adjustable whereby to accurately position it for cooperation with the blade rotor so as to accomplish proper lawn cutting upon advance of the mower.

Another important object of the present invention is to include a novel adjustable mount for the cutter bar; such mount having a manually adjustable stop to limit upward motion of said cutter bar, and the latter being yieldable downwardly to assure against rotor or cutter bar damage upon a stick or stone passing therebetween.

An additional object of this invention is to provide a cutter bar mount, as above, which is sturdy, compact, and effectively and rigidly supports such bar against displacement both laterally and lengthwise of the direction of travel; the only play or yielding, when the mower is in use, being downward as aforesaid.

It is also an object of the invention to provide an adjustable cutter bar which is designed for ease and economy of manufacture.

Still another object of the invention is to provide a practical and reliable adjustable cutter bar for lawn mowers, and one which will be exceedingly effective for the purpose for which it is designed.

These objects are accomplished by means of such structure and relative arrangement of parts as will fully appear by a perusal of the following specification and claims.

In the drawings:

Fig. 1 is a longitudinal, sectional elevation of an electric motor-driven lawn mower embodying the invention.

Fig. 2 is a front end elevation of the same.

Fig. 3 is a perspective view of the cutter bar, detached.

Referring now more particularly to the characters of reference on the drawings, the numeral 1 indicates generally the frame structure of the lawn mower, such frame structure including transversely spaced, upstanding side plates 2 disposed in facing relation and connected together in rigid relation by a horizontal deck or top plate 3. Such deck or top plate 3 is formed at the edges with downwardly and outwardly inclined front and rear flanges 4 and 5, respectively; the purpose of such flanges being to deflect cut grass downwardly.

A cross shaft 6 extends between, and is journaled in connection with, the upstanding side plates 2 below the top plate 3, and such shaft is fitted with a blade rotor 7 which includes a plurality of circumferentially spaced helical blades 8.

The shaft 6 and rotor 7 thereon are driven by a pulley 9 on one end of said shaft; such pulley in turn being actuated by an endless belt 10, pulley driven from an electric motor 11 mounted on the top plate 3.

A handle 12 extends at an upward and rearward incline from the frame structure 1, and includes a yoke 13 by means of which said handle is attached to the side plates 2.

The electric motor 11 is energized through the medium of a current supply cord 14 associated in part with the handle 12, and said cord has a handle-mounted control switch 15 therein.

The frame structure 1 is supported, at opposite ends, by wheels 16 whose spindles 17 are attached to vertically adjustable mounting arms 18 which extend longitudinally outside the side plates 2, being pivoted at one end and to said plates, as at 19, and each vertically adjustable at the other end by a wing nut and bolt 20 adjustable in a row of holes 21 in the related plate 2.

A transverse cutter bar 22 is disposed below the rotor 7 and cooperates with the same at substantially the low point thereof; such cutter bar being vertically adjustably mounted as follows:

The transverse cutter bar 22 is relatively wide lengthwise of the direction of travel, and at the rear portion thereof includes, in rigid relation, a transverse attachment bar 23 riveted in place and including integral, upstanding attachment ears 24 which face laterally and lie close to the corresponding side plates 2 some distance rearwardly of the vertical transverse plane of the axis of rotor 7; i. e., rearwardly of the low point of said rotor.

The ears 24 are secured to the plates 2 by pivot bolts 25 whereby the transverse cutter bar 22 is adjustable up or down about said pivots whereby to set said bar in proper cooperative position with respect to the blades 8 of rotor 7.

Such up and down adjustment, about pivots 25 of the cutter bar 22, is accomplished by the following arrangement:

Longitudinal arms 26 are fixed to the ears 24 and project forwardly outside of the corresponding ends of the rotor 7, and each such arm has a vertically upwardly offset portion intermediate its ends, as shown so as to miss the shaft 6.

At their forward ends, which are ahead of the rotor 7, the arms 26 are connected by an angleiron cross bar 27 disposed with one flange facing forwardly and the other flange facing upwardly; such upwardly facing flange being tapered toward the ends, as shown, whereby to not present too great an area for the accumulation of cut grass.

The rigid arms 26 are urged upwardly by vertical tension springs 28 connected between said arms adjacent the top bar 27 and points on the top plate 3 above the arms 26.

The extent to which the tension springs 28 can urge the arms 26 and consequently the cutter bar 22 upwardly is limited by the following stop mechanism:

Intermediate the ends thereof and adjacent the front edge, the top plate 3 has a block 29 affixed to the under side thereof by a screw 30 which runs through the front flange 4.

A vertical thumb screw 31, having a knurled head—as shown—is threaded downwardly through the block 29 and extends a distance therebelow. At its lower end the screw 31 is fitted with an enlarged stop flange 32, and a loaded compression spring 33 surrounds the screw 31 between said block 30 and flange 32; the purpose of such compression spring being to place the threads of the screw under load so that said screw does not accidentally rotate one way or the other from any selected position of adjustment.

On the under side thereof the enlarged stop flange 32 is fitted with a relatively thin pad 34 of leather or the like which rides the top flange of the cross bar 27.

In order to adjust the transverse cutter bar 22 to proper working position in cooperation with the rotor 7 at the bottom, it is only necessary to manually rotate the thumb screw 31 slightly clockwise or counter-clockwise, as the case may be; the tension springs 28 maintaining the cross bar 27 and said cutter bar 22 raised to the selected stop position.

It is therefore possible for the operator of the lawn mower, by the simple expedient of adjusting the thumb screw 31, to always maintain the cutter bar 22 properly set with respect to the rotor 7.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A cutter bar assembly for a lawn mower which includes a transverse, wheel-supported frame structure having side members, a cross plate extending therebetween, a central block secured to the plate at its forward end, and a rotor extending between and journaled on the side members below and back of the block; said assembly comprising a transverse cutter bar cooperating with the rotor at substantially the low point thereof, pivot means connecting the cutter bar at its ends to the side members and disposed rearwardly of said low point, rigid arms rigid with and projecting forwardly from opposite ends of the cutter bar below the axis of the rotor and between said rotor and the side members, a rigid cross bar connecting the arms ahead of the rotor and disposed below the block, and a vertical adjustable stop screw threaded through said block and bearing at its lower end on the cross bar centrally of its ends.

2. An assembly, as in claim 1, including a stop flange on the screw adjacent its lower end, and a loaded compression spring about the screw between said flange and the cross member.

3. An assembly, as in claim 1, with tension springs between the arms and cross member yieldably holding the cross bar up against the screw, and a cushion on the lower end of the screw bearing on the cross bar.

FRANKLIN W. JATUNN.

References Cited in the file of this patent

UNITED STATES PATENTS

| Number | Name | Date |
|---|---|---|
| 223,750 | Olcott | Jan. 20, 1880 |
| 1,122,709 | Farmer | Dec. 29, 1914 |
| 2,270,584 | Funk | Jan. 20, 1942 |
| 2,319,483 | Vondracek | May 18, 1943 |
| 2,329,383 | Bly | Sept. 14, 1943 |
| 2,341,913 | Fields | Feb. 15, 1944 |
| 2,576,593 | Goldberg | Nov. 27, 1951 |